United States Patent
Sharma et al.

(10) Patent No.: US 11,178,713 B2
(45) Date of Patent: Nov. 16, 2021

(54) MOBILE COMMUNICATIONS NETWORK, INFRASTRUCTURE EQUIPMENT, COMMUNICATIONS DEVICE AND METHODS

(71) Applicant: Sony Corporation, Tokyo (JP)

(72) Inventors: Vivek Sharma, Basingstoke (GB); Brian Alexander Martin, Basingstoke (GB); Shinichiro Tsuda, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 16/608,199

(22) PCT Filed: Mar. 8, 2018

(86) PCT No.: PCT/EP2018/055800
§ 371 (c)(1),
(2) Date: Oct. 25, 2019

(87) PCT Pub. No.: WO2018/197091
PCT Pub. Date: Nov. 1, 2018

(65) Prior Publication Data
US 2021/0112612 A1 Apr. 15, 2021

(30) Foreign Application Priority Data
Apr. 27, 2017 (EP) .................................... 17168565

(51) Int. Cl.
*H04W 76/15* (2018.01)
*H04W 76/19* (2018.01)
(Continued)

(52) U.S. Cl.
CPC .......... *H04W 76/15* (2018.02); *H04W 12/037* (2021.01); *H04W 72/04* (2013.01); *H04W 76/19* (2018.02)

(58) Field of Classification Search
CPC .. H04W 52/0206; H04W 72/04; H04W 76/27
(Continued)

(56) References Cited

U.S. PATENT DOCUMENTS 5,438,303 A * 8/1995 Murakami ............... H03K 7/08
332/109
6,088,062 A * 7/2000 Kanou ....................... G06F 3/14
345/561

(Continued)

FOREIGN PATENT DOCUMENTS

EP          2989835 B1 * 5/2014
WO      2015/005741 A1    1/2015
(Continued)

OTHER PUBLICATIONS

WiFi Direct and LTE D2D in action by Arash Asadi; Vincenzo Mancuso Published in: 2013 IFIP Wireless Days (WD) Nov. 2013 (Year: 2013).*

(Continued)

*Primary Examiner* — William D Cumming
(74) *Attorney, Agent, or Firm* — Xsensus, LLP

(57) ABSTRACT

A method for use in a mobile communications network that includes a plurality of infrastructure equipment each providing wireless connectivity within at least one cell, and a communications device configured to communicate wirelessly with at least a first infrastructure equipment including use of a radio bearer. The first infrastructure equipment performs the method including determining that there is a requirement to alter data handling resources allocated for handling the radio bearer in one or both of the first infra- (Continued)

structure equipment and the communications device, re-establishing, in response to the determination, its radio link control protocol layer, transmitting a reconfiguration message to the communications device to effect re-establishment of its radio link control protocol layer, and adding a new bit in the header of data packets transmitted to the communications device for a predetermined time after re-establishment of the radio link control protocol layer of the first infrastructure equipment.

15 Claims, 8 Drawing Sheets

(51) Int. Cl.
*H04W 12/037* (2021.01)
*H04W 72/04* (2009.01)

(58) Field of Classification Search
USPC ............. 455/422.1; 370/252, 328, 207, 468
See application file for complete search history.

(56) References Cited

U.S. PATENT DOCUMENTS

| | | | | |
|---|---|---|---|---|
| 6,798,735 | B1* | 9/2004 | Tzannes | H04L 27/2608 370/207 |
| 7,817,532 | B2* | 10/2010 | Tzannes | H04W 72/04 370/207 |
| 8,064,395 | B2* | 11/2011 | Gasparroni | H04L 45/306 370/329 |
| 8,305,924 | B2* | 11/2012 | Dwyer | H04W 76/27 370/252 |
| 8,310,970 | B2* | 11/2012 | Dwyer | H04W 52/0206 370/311 |
| 8,369,275 | B2* | 2/2013 | Tzannes | H04L 27/2608 370/329 |
| 8,767,698 | B2* | 7/2014 | Tzannes | H04W 72/04 370/341 |
| 9,226,271 | B2* | 12/2015 | Dwyer | H04W 76/27 |
| 9,467,976 | B2* | 10/2016 | Dwyer | H04W 52/0206 |
| 9,480,048 | B2* | 10/2016 | Earnshaw | H04L 1/1845 |
| 9,521,657 | B2* | 12/2016 | Dwyer | H04W 52/0206 |
| 9,713,142 | B2* | 7/2017 | Lee | H04W 76/10 |
| 9,998,734 | B2* | 6/2018 | Nakagami | H04N 19/55 |
| 10,462,769 | B2* | 10/2019 | Lee | H04W 72/0413 |
| 10,630,980 | B2* | 4/2020 | Nakagami | H04N 19/82 |
| 10,834,771 | B2* | 11/2020 | Sharma | H04W 76/15 |
| 2005/0083972 | A1* | 4/2005 | Tzannes | H04L 27/2608 370/468 |
| 2006/0209894 | A1* | 9/2006 | Tzannes | H04L 27/2608 370/468 |
| 2008/0227442 | A1* | 9/2008 | Pani | H04L 1/1877 455/422.1 |
| 2009/0016282 | A1* | 1/2009 | Gasparroni | H04L 45/24 370/329 |
| 2011/0019751 | A1* | 1/2011 | Tzannes | H04L 27/2608 375/259 |
| 2011/0182193 | A1* | 7/2011 | Dwyer | H04W 52/0229 370/252 |
| 2012/0033626 | A1* | 2/2012 | Dwyer | H04W 52/0229 370/329 |
| 2012/0051289 | A1* | 3/2012 | Dwyer | H04W 76/27 370/328 |
| 2013/0155870 | A1* | 6/2013 | Tzannes | H04W 72/04 370/241 |
| 2013/0176981 | A1* | 7/2013 | Earnshaw | H04L 1/02 370/329 |
| 2013/0188543 | A1* | 7/2013 | Dwyer | H04W 52/0206 370/311 |
| 2013/0316720 | A1* | 11/2013 | Dwyer | H04W 52/0229 455/450 |
| 2016/0135174 | A1* | 5/2016 | Lee | H04W 76/10 370/329 |
| 2018/0176903 | A1* | 6/2018 | Lee | H04W 72/042 |
| 2020/0008255 | A1* | 1/2020 | Sharma | H04W 76/15 |
| 2020/0077459 | A1* | 3/2020 | Yi | H04W 72/0413 |
| 2020/0187064 | A1* | 6/2020 | Susitaival | H04W 36/0069 |
| 2020/0322864 | A1* | 10/2020 | Wu | H04W 80/02 |
| 2020/0382431 | A1* | 12/2020 | Decarreau | H04L 1/188 |
| 2021/0022165 | A1* | 1/2021 | Sun | H04L 5/0057 |
| 2021/0058995 | A1* | 2/2021 | Sharma | H04W 12/0431 |

FOREIGN PATENT DOCUMENTS

| | | | |
|---|---|---|---|
| WO | 2015/005742 | A1 | 1/2015 |
| WO | 2016/021820 | A1 | 2/2016 |
| WO | 2018/059866 | A1 | 4/2018 |
| WO | WO-2019099550 | A1 * | 5/2019 ............. H04W 76/27 |

OTHER PUBLICATIONS

A Survey on 4G-5G Dual Connectivity: Road to 5G Implementation by Mamta Agiwal; Hyeyeon Kwon; Seungkeun Park; Hu Jin Published in: IEEE Access (vol. 9) Jan. 2021. (Year: 2021).*
International Search Report and Written Opinion dated May 25, 2018 for PCT/EP2018/055800 filed on Mar. 8, 2018, 8 pages.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN)," Release 14, 3GPP TS 36.300 V14.2.0, Mar. 2017, pp. 1-330.
3GPP, "3rd Generation Partnership Project; Technical Specification Group Radio Access Network; Study on Small Cell enhancements for E-UTRA and E-UTRAN; Higher layer aspects," Release 12, 3GPP TR 36.842 V12.0.0, Dec. 2012, pp. 1-71.
Holma, H., and Toskala, A., "LTE for UMTS: OFDMA and SC-FDMA Based Radio Access," System Architecture Based on 3GPP SAE, John Wiley & Sons, Ltd., 2009, 10 pages.
Huawei (Rapporteur), "Summary of [97bis#12][NR] Bearer type change (Huawei)," 3GPP TSG-RAN WG2 Meeting No. 98, R2-170XXXX, Hangzhou, China, May 15-19, 2017, 12 pages.
"3rd Generation Partnership Project; Technical Specification Group Radio Access Network; Evolved Universal Terrestrial Radio Access (E-UTRA); Radio Resource Control (RRC); Protocol specification (Release 14)",3GPP Standard ; Technical Specification ; 3GPP TS 36.331, 3rd Generation Partnership Project (3GPP), Mobile Ompetence Centre ; 650, Route Des Lucioles ; F-06921 Sophia-Anti Polis Cedex : France,vol. RAN WG2, No. VI4.2.2, Apr. 20, 2017 (Apr. 20, 2017), pp. 1-721. XP051298184,[retrieved on Apr. 20, 2017].

* cited by examiner

MOBILE COMMUNICATIONS NETWORK, INFRASTRUCTURE EQUIPMENT, COMMUNICATIONS DEVICE AND METHODS

CROSS-REFERENCE TO RELATED APPLICATIONS

The present application is based on PCT filing PCT/EP2018/055800, filed Mar. 8, 2018, which claims priority to EP 17168565.4, filed Apr. 27, 2017, the entire contents of each are incorporated herein by reference.

BACKGROUND

Field

The present disclosure relates to apparatus and methods for handling radio bearers in a telecommunications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunications systems, such as those based on the 3GPP defined UMTS and Long Term Evolution (LTE) and Long Term Evolution Advance (LTE-A) architectures, are applicable to communications between networked user devices such as mobile telephones, and more widely also to applications such as the Internet of Things. The networked devices are supported by a telecommunications network comprising base stations of various configurations offering connection coverage over particular areas, known as cells, and the base stations are in turn supported by a core network. Transmission of data and other signalling between these various entities is achieved by the use of radio bearers which transport the required messages, for example as a signalling radio bearer which carries operational information for the entities, or a data radio bearer which carries data. In some instances a bearer is direct between two entities (a base station and a user device), one sending the message and the other receiving it. In other cases, a radio bearer configured in dual connectivity (where a user device can connect to both a master and a secondary base station) may be used, allowing a received message to be divided between the radio handling resources of two receiving entities. This radio bearer configured in dual connectivity may be, for example, a split bearer. Hence, a radio bearer is divided between two base stations, each of which passes its part of the bearer to a user device. The user device is appropriately configured with resources to handle data received from each base station so that it can manage the bearer. This arrangement shares resources and enhances speed and efficiency.

The splitting of bearers in this way requires consideration of the operation of the resources in both of the entities between which the bearer is split, and the resources in the user device corresponding to each entity. Resources for each side of the bearer should be maintained in an operational state for successful handling of the message.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
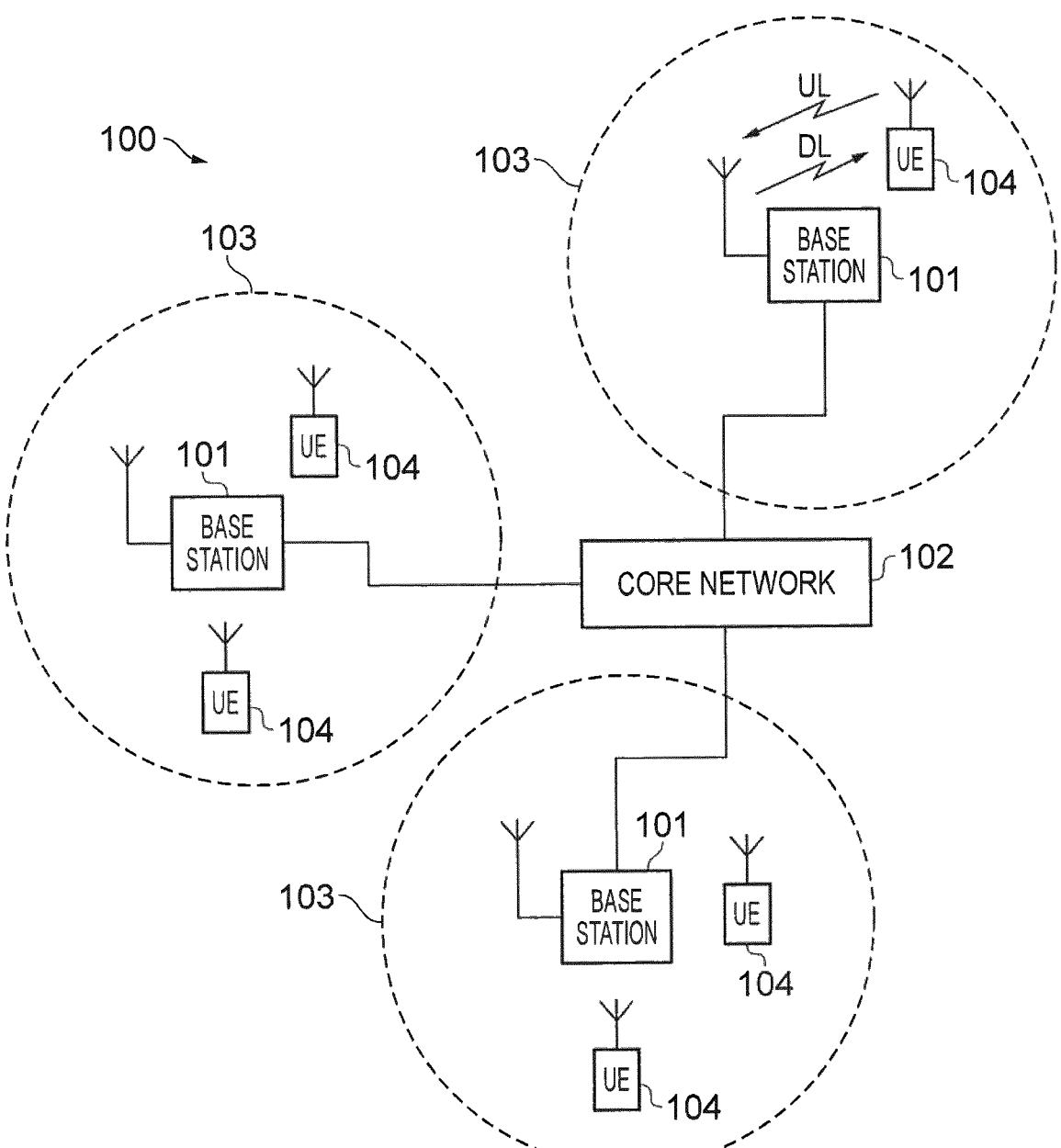
FIG. 1 shows a schematic representation of an example mobile telecommunications network or system.

FIG. 1 shows a schematic diagram illustrating some basic functionality of a mobile (cellular, wireless) telecommunications network/system, in this example operating generally in accordance with LTE principles, and which may be adapted to implement embodiments of the disclosure as described further below. Various embodiments of FIG. 1 and their respective modes of operation are well-known and defined in the relevant standards administered by the 3GPP® body, and also described in many books on the subject, for example Holma and Toskala [1]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 in FIG. 1 includes a plurality of base stations 101 connected to a core network 102. Each base station provides a coverage area or cell 103 within which data can be communicated to and from terminal devices or user equipment 104 within the respective coverage areas 103 via a radio downlink DL. Data is transmitted from user equipment 104 to the base stations 101 via a radio uplink UL. The uplink and downlink communications are made using radio resources that may be used by the operator of the network. The core network 102 routes data to and from each user equipment 104 via the respective base stations 101 and provides functions such as authentication, mobility management, charging and so on. Regarding terminology, terminal devices may also be referred to as mobile stations, user equipment (UE), user terminal, terminal, mobile radio, mobile terminal, mobile device, or simply device, and so forth. Base stations may also be referred to transceiver stations, nodeBs, e-nodeBs, eNBs and so forth.

Figure 1A:
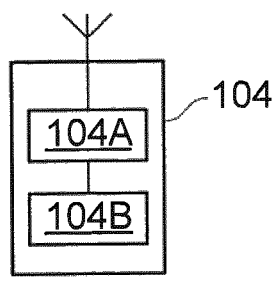
FIG. 1A shows a schematic representation of an example user equipment for use in a network such as the FIG. 1 example.

FIG. 1A shows a schematic representation of an example of a user equipment 104. The user equipment 104 comprises a transceiver unit 104A for transmission and reception of wireless signals and a processor unit 104B configured to control the user equipment. The processor unit 104B may comprise various sub-units for providing functionality in accordance with embodiments of the present disclosure as explained further herein. These sub-units may be implemented as discrete hardware elements or as appropriately configured functions of the processor unit. Thus the processor unit 104B may comprise a processor unit which is suitably configured/programmed to provide the desired functionality described herein using conventional programming/configuration techniques for equipment in wireless telecommunications systems. The transceiver unit 104A and the processor unit 104B are schematically shown on FIG. 1A as separate elements for ease of representation. However, it will be appreciated that the functionality of these units can be provided in various different ways, for example using a single suitably programmed general purpose computer, or suitably configured application-specific integrated circuit(s)/ circuitry. It will be appreciated that the user equipment will in general comprise various other elements associated with its operating functionality, for example a power source, user interface, and so forth, but these are not shown in FIG. 1A in the interests of simplicity.

Figure 1B:
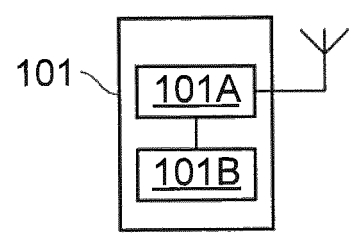
FIG. 1B shows a schematic representation of an example base station for use in a network such as the FIG. 1 example.

FIG. 1B shows a schematic representation of an example of a base station 101. In a network such as that in FIG. 1, each base station 101 may be functionally identical but each serves one or more different geographical area (cells 103). In some examples, base stations may be configured for operation in different related, or interworking, architectures, in an arrangement known as dual connectivity. In general, though, each base station 101 comprises a transceiver unit 101A for transmission and reception of communications between the base station and any user equipment 104 in its cell, and the core network 102. A base station 101 further comprises a processor unit 101B configured to control the base station 101 to operate in accordance with embodiments of the present disclosure as described herein. The processor unit 101B may again comprise various sub-units for providing functionality in accordance with embodiments of the present disclosure as explained herein. Theses sub-units may be implemented as discrete hardware elements or as appropriately configured functions of the processor unit. Thus, the processor unit 101B may comprise a processor unit which is suitably configured/programmed to provide the desired functionality described herein using conventional programming/configuration techniques for equipment in wireless telecommunications systems. The transceiver unit 101A and processor unit 101B are schematically shown in FIG. 1B as separate elements for ease of representation. However, it will be appreciated that the functionality of these units can be provided in various different ways, for example using a single suitably programmed general purpose computer, or suitably configured application-specific integrated circuits(s)/circuitry. It will appreciated that the base station 101 will in general comprise various other elements, for example a power supply, associated with its operating functionality.

In particular, the processor units of user equipment and base stations include resources for handling radio bearers. The resources may include a protocol stack comprising layers including a PDCP (packet data convergence protocol), a RLC (radio link control) and a MAC (medium access control), where the layers may be dedicated to particular types of radio bearer, or may be shared. Under particular events in the network operation, one or more parts of the resources may need to be reset or re-established for continued operation, which herein is referred to generally as reconfiguration, or alternatively as alteration, indicating some change in in the resources, including resetting, re-establishment, clearing, removing from use and other like procedures that alter the way in which the resources are able to handle one or more radio bearer types. The procedures for resetting and re-establishing are well-understood, and specified in the 3GPP standards. For example, the MAC reset procedure is specified in section 5.9 of 3GPP specification TS 36.321, the RLC re-establishment procedure is specified in section 5.4 of 3GPP specification TS 36.322, and the PDCP re-establishment is specified in section 5.2 of 3GPP specification TS 36.323. On a high level, a layer is reset during reset or re-establishment, but different terminology is used in the different specifications for the various protocol layers.

As is well understood, in wireless telecommunications networks such as an LTE type network, there are different Radio Resource Control (RRC) modes for terminal devices, including governing the connection state between the terminal device and a base station. These include an idle mode and a connected mode. Generally speaking, in RRC connected mode a terminal device is connected to a base station in the sense of being able to receive user plane data from the base station, whereas in RRC idle mode the terminal device is unconnected to a base station in the sense of not being able to receive user plane data from the base station. However, in idle mode the terminal device may still receive some communications from base stations, for example, reference signalling for cell reselection purposes and other broadcast signalling.

While the FIG. 1 example network shows all base stations (eNBs) as being the same, and each supporting one cell, in some networks and systems other arrangements may be used. For example, in Release 12 of the 3GPP standard governing the LTE architectures, the concept of dual connectivity (DC) was introduced. In dual connectivity, base stations are specified as being either a master base station or a secondary base station, and user equipment can connect with both.

Figure 2:
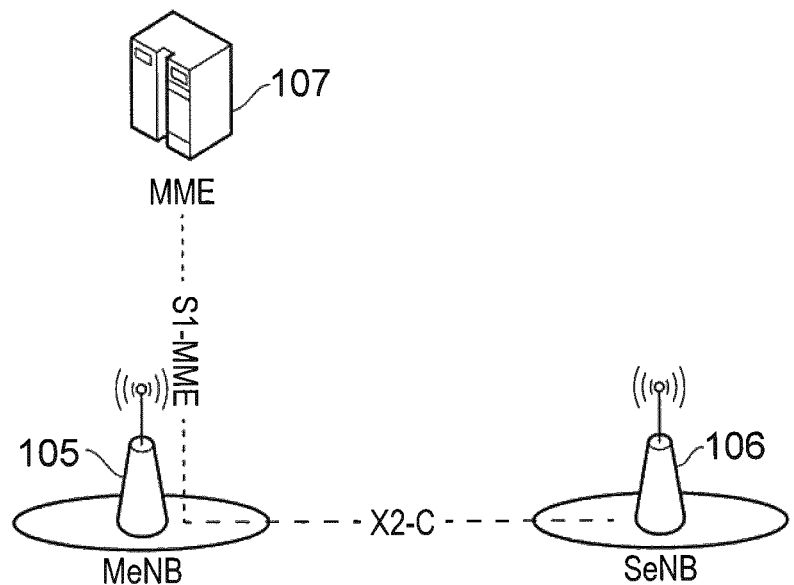
FIG. 2 shows a schematic representation of base stations and user equipment arranged for dual connectivity.

FIG. 2 shows a schematic representation of the control plane architecture specified for dual connectivity. A master base station 105 (designated MeNB) and a secondary base station 106 (designated SeNB) communicate via a control plane using X2-C layer protocol. However, unlike the description above in which any base station is involved in handling RRC communications, in dual connectivity only the MeNB 105 is designated for RRC handling. Consequently, the RRC entity resides in the MeNB 105, and communication with the core network in the form of a mobility management entity 107 (MME) via an S1-MME protocol layer terminates in the MeNB 105.

Figure 3:
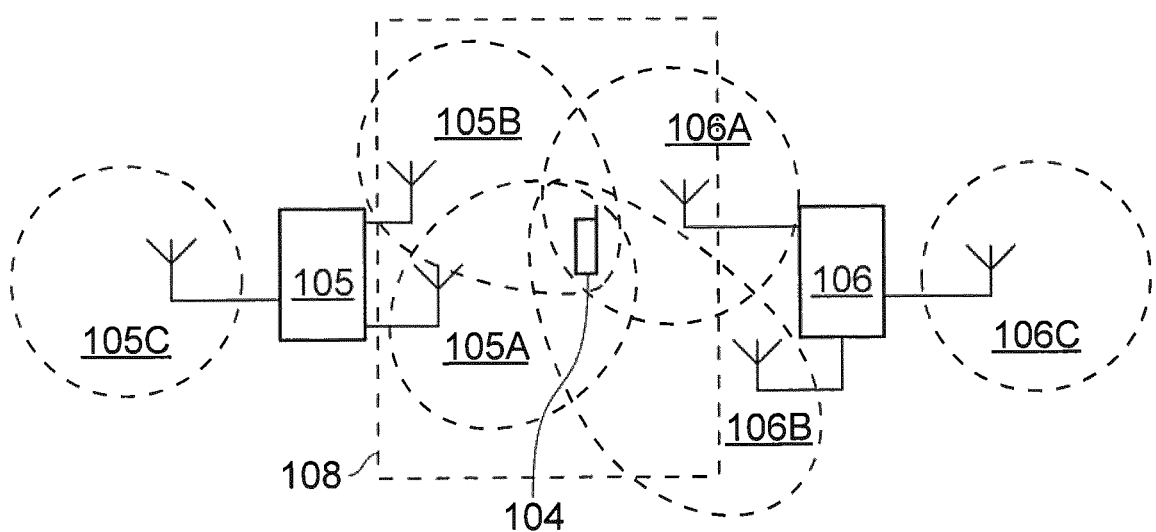
FIG. 3 shows a schematic representation of base stations and user equipment with cells arranged in groups.

Also, it is possible for a base station, being a master or a secondary eNB, to support more than one cell. FIG. 3 shows a schematic representation of part of a network having a MeNB 105 supporting three cells 105A, 105B and 105C, and a SeNB 106 supporting three cells 106A, 106B and 106C. A user equipment UE 104 has access to cells from both eNBs, indicated as the group 108. Within the group 108, one cell can be a primary cell, from the MeNB cells. Within the group 108 relating to the UE 104, the MeNB cells 105A and 105B are designated as a master cell group MCG, and the SeNB cells 106A and 106B are designated as a secondary cell group SCG. The UE 104 has access to the cells of MCG and the two cells of the SCG, indicated by the overlapping cell areas in FIG. 3.

A purpose of the dual connectivity arrangement is to enable sharing and combining of resources belonging to different base stations. This sharing is expressed in the concept of split bearers.

Figure 4:
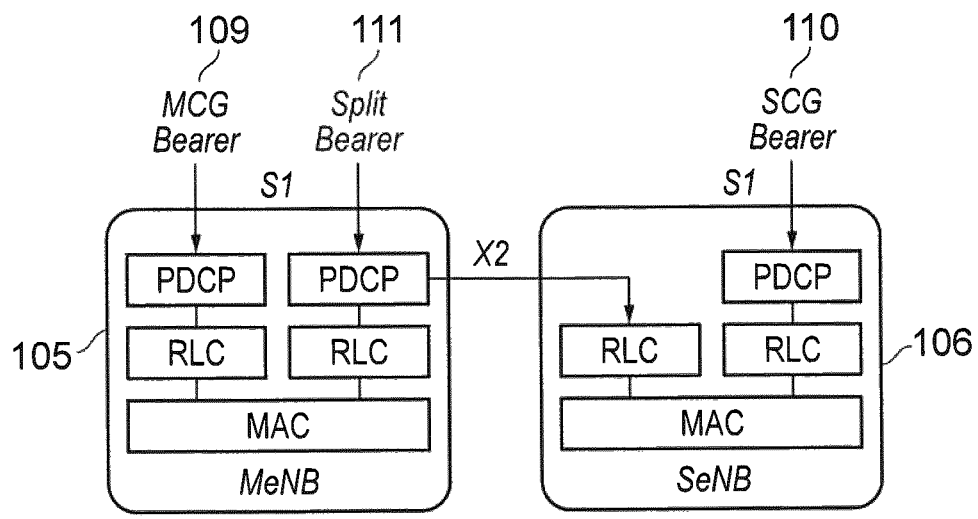
FIG. 4 shows a schematic representation of an example user plane protocol stack for dual connectivity.

FIG. 4 show a schematic representation of an example user plane protocol stack for a dual connectivity arrangement. Typically, an incoming message arrives via a bearer and is handled by the various protocol layers defined within the LTE architecture. Once master and secondary eNBs are defined and grouped in dual connectivity, one can further designate a bearer intended for the MeNB 105 as a master cell group bearer, MCG bearer 109, and a bearer intended for the SeNB 106 as a secondary cell group bearer, SCG bearer 110. A bearer arrives via the S1 protocol layer, is handled by the eNB's resources in turn by a packet data convergence protocol (PDCP), then a radio link control (RLC) protocol, and then the medium access control (MAC) layer. As shown in FIG. 4, each eNB 105, 106 has these resource layers to handle received bearers.

In addition to the MCG bearer and the SCG bearer, dual connectivity defines a third, split bearer, for the purpose of sharing resources in the MeNB and the SeNB on the network side of the telecommunications system. A split bearer 111 is delivered to a PDCP in the MeNB 105, and the MeNB 105, at the PDCP, then controls a split or division of the split bearer's data between the MeNB 105 and the SeNB 106. Data for the MeNB 105 is passed to the MeNB's RLC and then its MAC, and data for the SeNB 106 is passed from the MeNB 105, using the X2 protocol layer, to an RLC in the SeNB and then to the MAC of the SeNB.

In order to be able to handle a message carried by a split bearer once it is passed on from the two eNBs, a UE is provided with two MAC entities, a master cell group MAC (MCG MAC) and a secondary cell group MAC (SCG MAC), plus corresponding RLC and PDCP. These are included in the resources of the UE for split bearer handling.

As mentioned above, only the MeNB has a RRC entity, so signalling radio bearers for RRC are transported over the MCG only, i.e. by MCG bearer. The SCG is not involved in the transporting of RRC messages. For UEs configured for dual connectivity and split bearer transport, user traffic from the core network can be received at the MeNB as a split bearer, and then divided between the MeNB and the SeNB for handling and passing to the UE. Any traffic on a SCG bearer is received from the core network at the SeNB and transported using resources of the SeNB to the UE.

In the context of LTE, further details regarding dual connectivity can be found in the 36.300 specification at sections 6.5 and 7.6, and also in 3GPP TR 36.842.

As can be seen from FIG. 4, a bearer arrives at the PDCP protocol layer. The PDCP is involved in security of the data traffic, including ciphering using a key. Each PDCP in each network entity (eNBs and UEs, for example) will use its own key; these are regularly updated. The MeNB may use a key designated as KeNB, while the SeNB may use a key designated as SKeNB. Other parameters are utilised by the PDCP together with the key to effect security; these include a numerical counter to generate successive numbers in a sequence of count values. Hence there is a set of parameters, used in a security algorithm to perform the ciphering. Each set of parameters, one for each successive number from the count value, is used only once for ciphering, to maintain security. The count value has a maximum number that can be generated, so for a given key, once this number is reached, there are no new parameter sets available for ciphering. Re-use of parameters is undesirable, so it is preferred to acquire a new key for the PDCP and start the count value sequence again at its beginning (at zero, for example), to work through all successive values in the count value sequence with the new key. The expiration of the numbers available from the counter can be referred to as "rollover", and hereinafter the disclosure may mention "PDCP rollover", "PDCP counter rollover", "PDCP count rollover or "count rollover". The process following rollover, including acquisition of a new key, has a high processing overhead associated with it, and requires a resetting of the MAC layer for handling of ciphering with the new key.

An example of a possible network configuration for future telecommunications is an arrangement comprising an LTE architecture providing wide (macro) coverage in conjunction with a so-called new radio (NR), referring to current and future telecommunications methods allowing increased data throughput, such as 4th and 5th generations (4G and 5G) and further. The type of radio access technology (RAT) used in the LTE network and the new radio network may be different, but an LTE network and a NR network could interwork, where a benefit of having connectivity to both LTE and NR is reduced signalling towards the core network from mobility towards the core network being anchored at the LTE macro entity, combined with higher throughput made possible be utilising resources in both LTE and NR. A UE will be configured to operate under both RATs. In this context, dual connectivity is relevant, such that MeNBs may be designated from LTE and SeNBs from NR, or vice versa.

Split bearers are therefore also relevant, and a new split bearer configuration is considered, namely a secondary cell group split bearer, or SCG split bearer.

Figure 5:
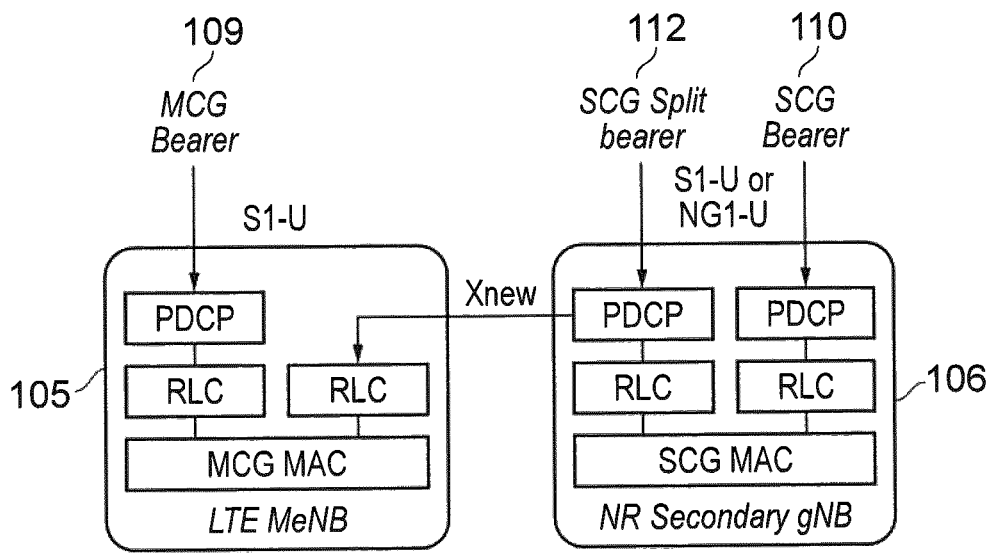
FIG. 5 shows a schematic representation of a modified example user plane protocol stack for dual connectivity.

FIG. 5 shows a schematic representation of an example user plane protocol stack utilising a SCG split bearer. As in FIG. 4, a master node 105 (in this example in the LTE side) and a secondary node 106 each receive their designated bearers, MCG bearer 109 and SCG bearer 110 respectively, and these are handled by a PCDP, a RLC and a MAC layer, as before. No conventional split bearer is included, however; instead there is a SCG split bearer 112 which is delivered to the SeNB 106 (labelled Secondary gNB in FIG. 5 to indicate a difference from the eNB of FIG. 4 owing to the addition of the NR network). A PDCP in the SeNB 106 receives the SCG split bearer 112 and divides the data. Some is retained in the SeNB, being passed to the RLC and MAC layers. Other data is passed from the SeNB 106 to the MeNB 105 via an X protocol layer (labelled Xnew to indicate possible change from the X layers within LTE, such as the X1 layer in FIG. 4), and the MeNB 105 handles it with its own RLC and MAC resources.

The SCG split bearer is proposed in the context of the higher data rates that can be handled in an NR architecture. Note this is merely an example, however, and secondary cell group split bearers are relevant in other contexts also.

FIG. 5 shows SCG split and SCG bearers together, and they may be simultaneously used or supported. SCG bearer can be considered as a special case of SCG split bearer, in which 100% of the data traffic is over the SCG and 0% over the MCG. Either or both of the SCG bearer and the SCG split bearer may coexist alongside the MCG bearer. Coexistence of the MCG split bearer (as in the FIG. 4 example) and the SCG split bearer is possible despite different transport requirements during Rel-12 DC and hence a need for a high bandwidth in the user plane anchor. However, any coexistence of bearer types is not relevant to the present disclosure, and embodiments and examples addressing the SCG split bearer can be implemented regardless of other secondary node bearers.

However, the coexistence of the MCG bearer and the SCG split bearer implies that there will be at least one PDCP entity in the MCG, to handle the MCG bearer, and at least one PDCP entity in the SCG, to handle the SCG split bearer. Consequently, ciphering will be carried out using two keys, the KeNB in the MCG PDCP and the SKeNB in the SCG PDCP. The MeNB MAC receives data ciphered with both keys.

Recall the above discussion that mentioned PDCP count rollover. Under 3GPP Release 12 for dual connectivity, a "SCG change" procedure is defined for situations including a rollover of the SeNB PDCP receiving the SCG bearer. This is defined in section 10.1.2.8.6 of the 36.300 standard, and includes the requirement that "During SCG change, MAC configured for SCG is reset and RLC configured for SCG is re-established regardless of the bearer type(s) established on SCG. For SCG bearer, PDCP configured for SCG is re-established. In case of reconfiguration from split to MCG bearer, RLC configured for SCG is released. During SCG change, S-KeNB key is refreshed."

Figure 6:
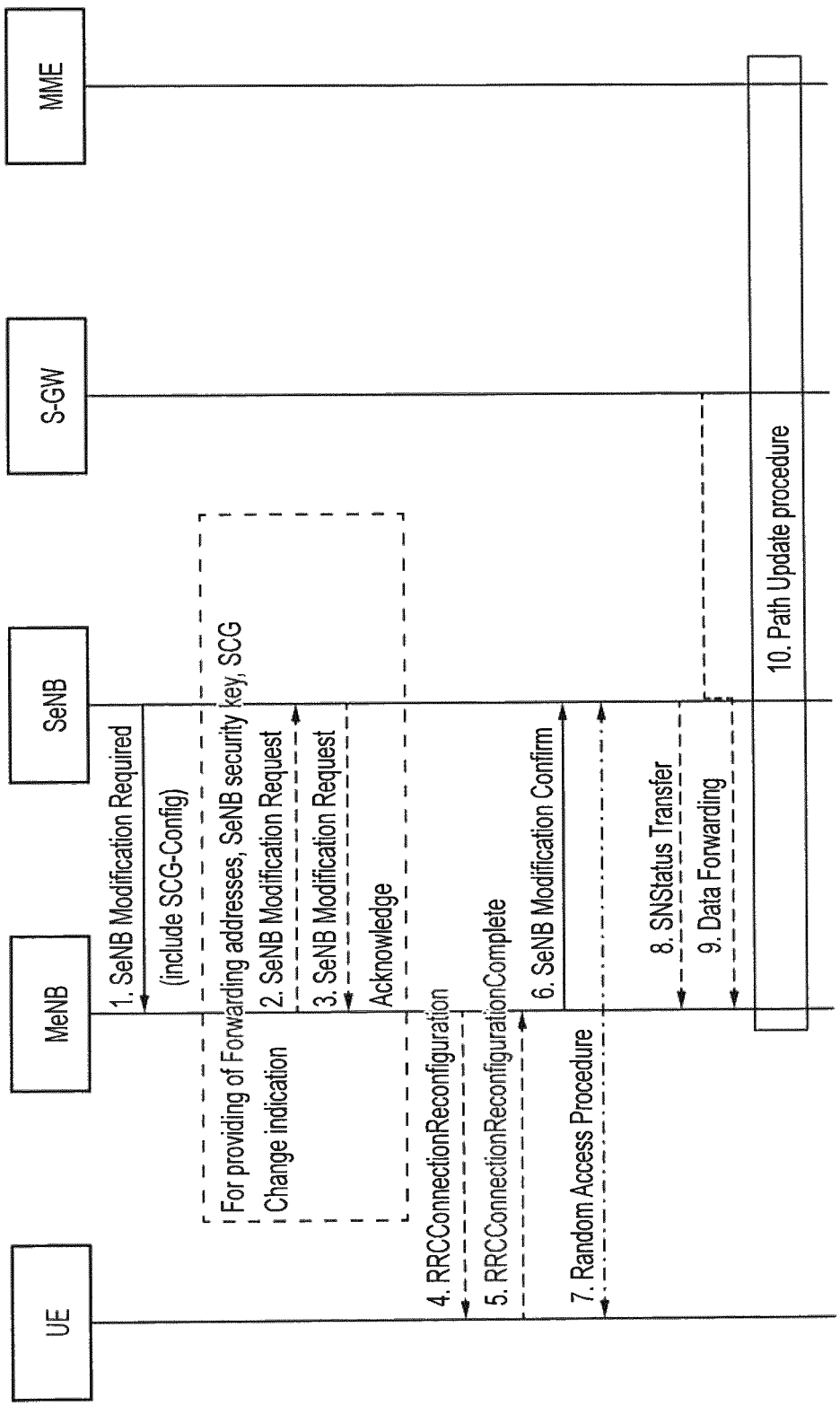
FIG. 6 shows a ladder diagram of steps in a reconfiguration ("change") procedure for use following a protocol counter rollover in a secondary cell group within a network.

The SCG change procedure is applicable in a range of scenarios. FIG. 6 shows a depiction of a SeNB modification procedure which uses the SCG change procedure, from standard 36.300 section 10.1.2.8.2.

This scope of SCG change procedure is restricted to cells under control of the SeNB, and therefore in the SCG. However, a SCG split bearer will use a RLC instance in the MCG (see FIG. 5), and share the MCG MAC with other MCG bearers including SRBs (signalling radio bearers, for RRC signalling). An SCG SRB may be configured in addition using SCG MAC so both MAC entities are involved in handling of signalling radio bearers in case of LTE-NR dual connectivity. Also, note that in any change between MCG bearer and (conventional) split bearer there will be no need to reset any of the MCG resources because ciphering for both bearers is done in MCG PDCP (see FIG. 4), and MCG RLC and MCG MAC can continue without any reset. This is not possible for the SCG split bearer, however, because the SCG PDCP in the SeNB will cipher the SCG split bearer, before passing it to resources in the MCG (RLC and MAC in the MeNB).

Hence, a difficulty can arise for SCG split bearers when a PDCP count rollover occurs in the SeNB. Recall from above that a count rollover initiates the SCG change procedure, which includes refreshing of the SKeNB key. Resources in the MeNB may then be unable to handle their allocated part of the SCG split bearer.

Standard 36.300, section 14.1 specifies PDCP count in dual connectivity as: SCG bearers in DC share a common pool of radio bearer identities (DRB IDs) together with the MCG bearers and when no new DRB ID can be allocated for an SCG bearer without guaranteeing COUNT reuse avoidance, the MeNB shall derive a new $S\text{-}K_{eNB}$. SeNB indicates to MeNB when uplink or downlink PDCP COUNTs are about to wrap around and MeNB shall update the $S\text{-}K_{eNB}$. To update the $S\text{-}K_{eNB}$, the MeNB increases the SCG Counter and uses it to derive a new $S\text{-}K_{eNB}$ from the currently active KeNB in the MeNB. The MeNB sends the newly derived $S\text{-}K_{eNB}$ to the SeNB. The newly derived $S\text{-}K_{eNB}$ is then used by the SeNB in computing a new encryption key $K_{UPenc}$ which is used with all DRBs in the SeNB for this UE. Furthermore, when the SCG Counter approaches its maximum value, the MeNB refreshes the currently active KeNB, before any further $S\text{-}K_{eNB}$ is derived.

From this we can appreciate that in the event of PDCP rollover for a SCG split bearer, it is required that the SCG change procedure should be initiated for the resources under the SeNB, i.e. SCG RLC and PDCP should be re-established and the SCG MAC is reset. In the scenario of LTR-NR interworking described above, it is likely that PDCP count rollover will happen in the NR PDCP (in other words, the SeNB, as in FIG. 5), because the majority of the data traffic will be pushed using NR (rather than LTE) to take advantage of the higher throughput. Accordingly, following a similar logic, and because SCG split bearer data packets will be ciphered by the SCG PDCP, rollover of the SCG PDCP suggest a requirement for a change procedure in which the MCG RLC should be re-established, and the MCG MAC should also be reset.

Consequently, a proposal to address the issue of PDCP rollover in the SeNB when SCG split bearers are used, as disclosed in co-pending European patent application no. EP16191055, is to ensure that appropriate handling of the MCG resources is undertaken, which in some examples includes resetting/re-establishing of the MCG RLC and the MCG MAC. Some of these proposals include proposals which seek to avoid an MCG MAC reset.

Figure 7:
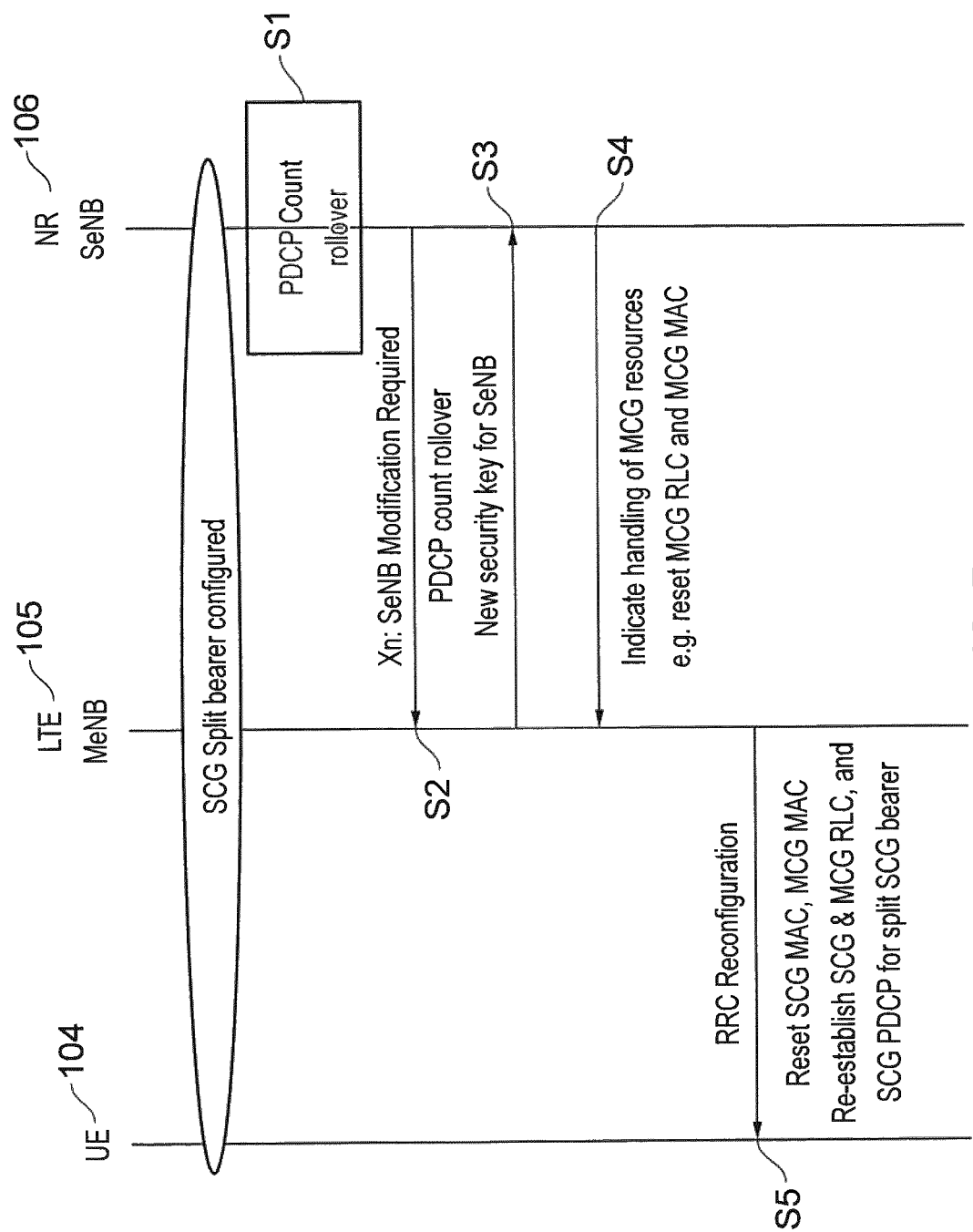
FIG. 7 shows a ladder diagram of steps in an example procedure for use following a protocol counter rollover in a secondary cell group within a network.

FIG. 7 shows a ladder diagram indicating steps in a first proposal of a method to achieve this. A network and its entities are configured for SCG split bearer use. For example, the entities comprise a UE 104, a MeNB 105 in a LTE architecture and a SeNB 106 in a NR architecture. In a first step S1, PDCP count rollover is recognised in the SeNB 106. In step S2, the SeNB 106 indicates to the MeNB 105 that PDCP rollover has occurred so that SeNB resource modification (reconfiguration) is required. In response, the MeNB 105 creates a new security key for the SeNB 106, and sends it to the SeNB 106 in step S3. Note that steps S1, S2 and S3 are the same as in the known SCG change procedure. Under the proposal, however, a next step S4 requires the SeNB 106 to additionally indicate to the MeNB 105 that handling (modification, reconfiguration) of the MCG resources relevant to the SCG split bearer is required, so that the MCG RLC and the MCG MAC are to be reset; the MeNB 105 performs this. Finally, in Step S5, the MeNB 105 carries out RRC reconfiguration of the UE 104. This also occurs in the SCG change procedure, in that the UE's SCG MAC is reset and its SCG RLC is re-established, but additionally here the UE's MCG MAC is reset and its MCG RLC is re-established (recall that the UE is provided with resources for both the MCG and the SCG for operation under dual connectivity, so it has two MAC entities, for example). The UE's SCG PDCP for the split SCG bearer is also re-established.

However, this solution presents issues in that resetting the MCG MAC will impact the SRBs and DRBs (signalling and data radio bearers) arriving at the MCG. The RLC in the MeNB should not be affected because there is a single instance of RLC per RB. However the MAC layer is configured for a whole cell group (MCG or SCG). Consequently, it would be preferable to avoid resetting the MAC. It is equivalent to moving the UE to RRC idle state, which is clearly problematic.

Figure 8:
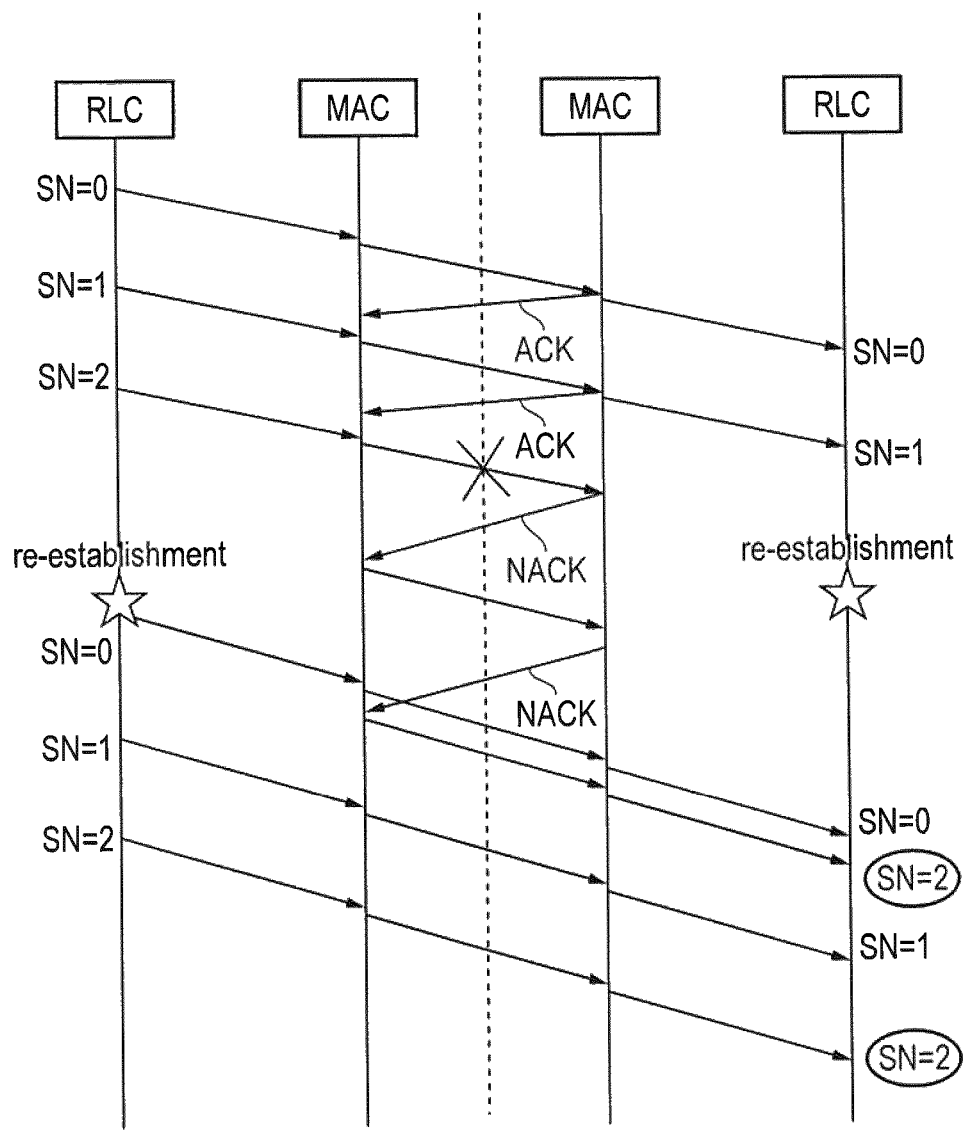
FIG. 8 shows a first example signal flow diagram between a transmitting entity and a receiving entity where multiple PDUs may be received with the same sequence number.

On the other hand, if the MCG MAC is not reset, one consequence is that there may be data packets (herein also "packets") in the MCG MAC HARQ buffer for the SCG split bearer which will halt a HARQ process or make it unusable. HARQ, or hybrid automatic repeat request, combines high-rate forward error correcting coding and ARQ error control, and is a process undertaken in the MAC, taking packets stored in the HARQ buffer. Such a scenario is shown in FIG. 8, where it can be seen that, due to not having been received successfully before re-establishment, a packet with a sequence number (SN) of 2 is retransmitted successfully after re-establishment, along with a second packet with an SN of 2. Resetting the MAC clears the buffer, and hence addresses any halt or unusability of a HARQ process. As a consequence, it is important to consider carefully the prospect of resetting or not resetting the MCG MAC to address an SCG PDCP count rollover.

A second proposal as disclosed in co-pending European patent application no. EP16191055, the contents of which are incorporated herein by reference. The arrangement disclosed in EP16191055 provides an alternative to that in FIG. 7, is to not reset the MCG MAC, and limit the handling of the MCG resources to a re-establishment of the MCG's RLC for SCG split bearer only. DRB release for conventional bearers does not involve a MAC reset, so omitting this procedure is feasible. Note however that it is assumed that there will be no packets queued in the HARQ for a bearer about to be released so that all processes continue as usual for the remaining DRBs.

A benefit of not resetting the MCG MAC for a SCG split bearer is that there will be no interruption of traffic on the MCG side of the link. However, there may be packets in the MCG MAC related to the SCG split bearer. An option to manage these is to continue with the transmission/reception until the HARQ processes have cleared, for example by setting a timer for the HARQ operation so that it is assumed to have cleared when the timer expires. Then, the MCG MAC discards any remaining packets related to the SCG split bearer after the MCG RLC has been re-established and the timer has expired (or the HARQ queue is otherwise empty or deemed empty).

A MAC reset is not limited only to PDCP Count rollover. It may also include bearer type switching, which involves handling of L2 protocols including MCG and SCG-MAC. A proposal relating to allowed bearer type change options in RAN2 #97bis is summarised as follows:

LTE-NR DC should support at least the following bearer type change options
MCG bearer to/from MCG split bearer,
MCG bearer to/from SCG bearer,
MCG bearer to MCG bearer,
SCG bearer to SCG bearer,
MCG split bearer to MCG split bearer
LTE-NR DC should not support the direct bearer type change between MCG split bearer and SCG bearer.
LTE-NR DC should support the one step bearer type change between MCG bearer to/from SCG split bearer.
LTE-NR DC shall support the bearer type change between SCG bearer and SCG split bearer.
LTE-NR DC should support the bearer type change between SCG split bearer and SCG split bearer.
LTE-NR DC may also support the direct type change between MCG split bearer to/from SCG split bearer.

In the following scenarios, where traditionally in Rel-12, DC MAC was reset, it can be envisaged that a MAC reset should not be required:

MCG to MCG change due to security when KeNB refresh is needed. This procedure relied on intra cell handover and all protocol entities were reset. In embodiments of the present technique, MCG-PDCP and MCG-RLC will still be re-established but MAC entity survives reset.
A similar situation as above occurs for SCG to SCG change due to security. This case is similar to EP16191055, but EP16191055 focused only on SCG split bearer.
The main focus of EP16191055 was the question of whether the L2 handling in Table I (taken from the discussion related to the RAN2 #97bis meeting) below can be used for LTE NR DC for SCG bearer to/from SCG split bearer and changed due to security.
Scenario of whether the L2 handling in Table II (taken from the discussion related to the RAN2 #97bis meeting) below can be used for LTE NR DC for SCG split bearer to/from SCG split bearer was not considered in EP16191055.
All other scenarios where SCG MAC is reset based on SCG Change procedure.

TABLE I

| | SCG bearer to/from SCG split Bearer | | | |
|---|---|---|---|---|
| Bear type change | MCG/SCG | PDCP | RLC/DTCH | MAC |
| SCG to SCG split | MCG part | N/A | establish | No impact |
| | SCG part | Reestablished (SCG change) | Reestablished (SCG change) | reset (SCG change) |
| SCG split to SCG | MCG part | N/A | Release | No impact |
| | SCG part | Release? | Reestablished (SCG change) | reset (SCG change) |

TABLE II

| | SCG split bearer to/from SCG split bearer | | | |
|---|---|---|---|---|
| Bear type change | MCG/SCG | PDCP | RLC/DTCH | MAC |
| SCG split to SCG split | MCG part SCG part | N/A Reestablished (SCG change) | reestablish Reestablished (SCG change) | No impact reset (SCG change) |

Embodiments of the present technique address how to avoid the reset of the MAC entity when the upper L2 sublayers (i.e. RLC and PDCP entities) are re-established. As previously described in EP16191055, the resetting of MCG MAC disrupts SRBs and so should be avoided. However, re-establishing RLC without a MAC reset will mean that there may be residual data leftover in the MAC layer. For example RLC PDUs which have been transmitted (by RLC) are sitting in the HARQ transmission buffer in MAC because for example HARQ ACK has not yet been received. These PDUs need to be retransmitted by the MAC layer. The problem with this is that it becomes ambiguous to the RLC layer whether the PDU SN corresponds to the SN after resetting to 0, or if it belongs the SN of PDUs that were transmitted before RLC re-establishment. This is a particular problem if the SN before RLC re-establishment is a low value. When the SN is reset to 0, it is not clear whether the SN related to before or after reset. The receiving RLC entity needs to know, so that SDUs can be reassembled and passed to PDCP layer.

EP16191055 covered RRC/MAC/PHY signaling and RLC status report based solutions. These solutions may require extra signaling and does not explicitly cover a new field in RLC header.

Figure 9:
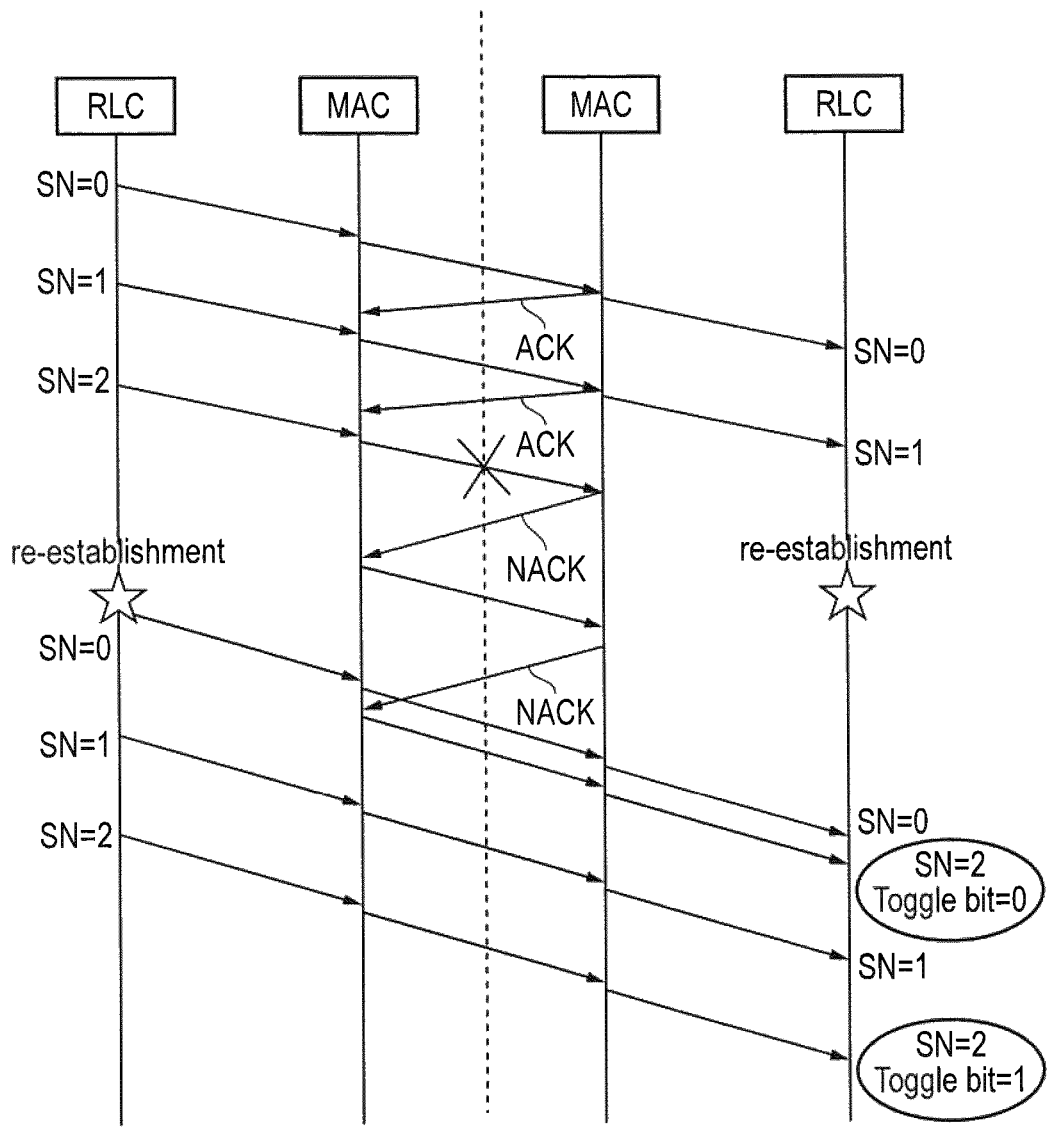
FIG. 9 shows a second example signal flow diagram between a transmitting entity and a receiving entity where multiple PDUs may be received with the same sequence number in accordance with embodiments of the present technique.

Embodiments of the present technique serve to introduce a new bit in an RLC packet header. The bit is toggled in the transmitter RLC entity after RLC sublayer is re-established and included in the header field of all RLC PDUs generated after reestablishment. This bit will ensure that a MAC entity continues the operation and transmit/retransmit HARQ segments as normal. The receiving HARQ entities will receive HARQ segments and prepare RLC PDUs as normal. RLC PDUs which have been prepared before RLC entity reestablishment will either have no new bit or e.g. include a bit set to "0". RLC PDUs sent by the RLC transmit entity after reestablishment will either include a new bit or toggle the bit to "1". FIG. 9 demonstrates a process according to embodiments of the present technique. Unlike in FIG. 8, where following re-establishment, two identical packets or PDUs with an SN of 2 are received, it is clear from a difference in the toggled bit which of the PDUs with SN=2 should have been received before the re-establishment and which of the PDUs with SN=2 was transmitted before the re-establishment.

In other words, such embodiments of the present technique disclose a method for use in a mobile communications network, the mobile communications network comprising a plurality of infrastructure equipment each providing wireless connectivity within at least one cell, and a communications device configured to communicate wirelessly with at least a first of the infrastructure equipment including by the use of a radio bearer, the method comprising the first infrastructure equipment determining that there is a requirement to alter data handling resources allocated for handling the radio bearer in one or both of the first infrastructure equipment and the communications device, re-establishing, in response to the determination, its radio link control protocol layer (and/or PDCP layer), transmitting a reconfiguration message to the communications device to effect re-establishment of its radio link control protocol layer (and/or PDCP layer), and subsequently effecting a change in the header of (RLC) data packets transmitted to the communications device.

In some embodiments of the present technique, the cells are arranged into a master cell group under control of the first infrastructure equipment, the first infrastructure equipment being a master infrastructure equipment, and a secondary cell group under control of a secondary infrastructure equipment, and the communications device is configured to communicate wirelessly with the master infrastructure equipment and the secondary infrastructure equipment, and the radio bearer is configured in dual connectivity and receivable at the secondary infrastructure equipment for splitting between the secondary infrastructure equipment and the master infrastructure equipment before delivery to the communications device. The determining that there is a requirement to the alter data handling resources may comprise receiving at the master infrastructure equipment a notification transmitted by the secondary infrastructure equipment when the secondary infrastructure equipment exhausts a supply of unique parameter sets used in security ciphering of received radio bearers configured in dual connectivity.

In some embodiments of the present technique, the cells are arranged into a master cell group under control of a master infrastructure equipment and a secondary cell group under control of the first infrastructure equipment, the first infrastructure equipment being a secondary infrastructure equipment, and the communications device is configured to communicate wirelessly with the master infrastructure equipment and the secondary infrastructure equipment, and the radio bearer is configured in dual connectivity and receivable at the secondary infrastructure equipment for splitting between the secondary infrastructure equipment and the master infrastructure equipment before delivery to the communications device. The determining that there is a requirement to the alter data handling resources may comprise exhausting at the secondary infrastructure equipment a supply of unique parameter sets used in security ciphering of received radio bearers configured in dual connectivity.

In some embodiments of the present technique, there is also defined a method for use in a mobile communications network, the mobile communications network comprising a plurality of infrastructure equipment each providing wireless connectivity within at least one cell, wherein the cells are arranged into a master cell group under control of a master infrastructure equipment and a secondary cell group under control of a secondary infrastructure equipment, and a communications device is configured to communicate wirelessly with the infrastructure equipment including by the use of a split radio bearer receivable at the secondary infrastructure equipment for splitting between the secondary infrastructure equipment and the master infrastructure equipment before delivery to the communications device.

The method comprises, when the secondary infrastructure equipment exhausts a supply of unique parameter sets used in security ciphering of received split radio bearers, the secondary infrastructure equipment sending a notification to the master infrastructure equipment of a requirement to alter data handling resources allocated for handling split radio bearers received from the secondary infrastructure equipment in one or both of the master infrastructure equipment and the communications device, and the master infrastructure equipment, in response to the notification, re-establishing its radio link control protocol layer and transmitting a reconfiguration message to the communications device to effect re-establishment of its radio link control protocol layer, and subsequently effecting a change in the header of data packets transmitted to the communications device. The change in the header of the data packets comprises the addition of a new bit, or comprises toggling the value of a bit.

Figure 10:
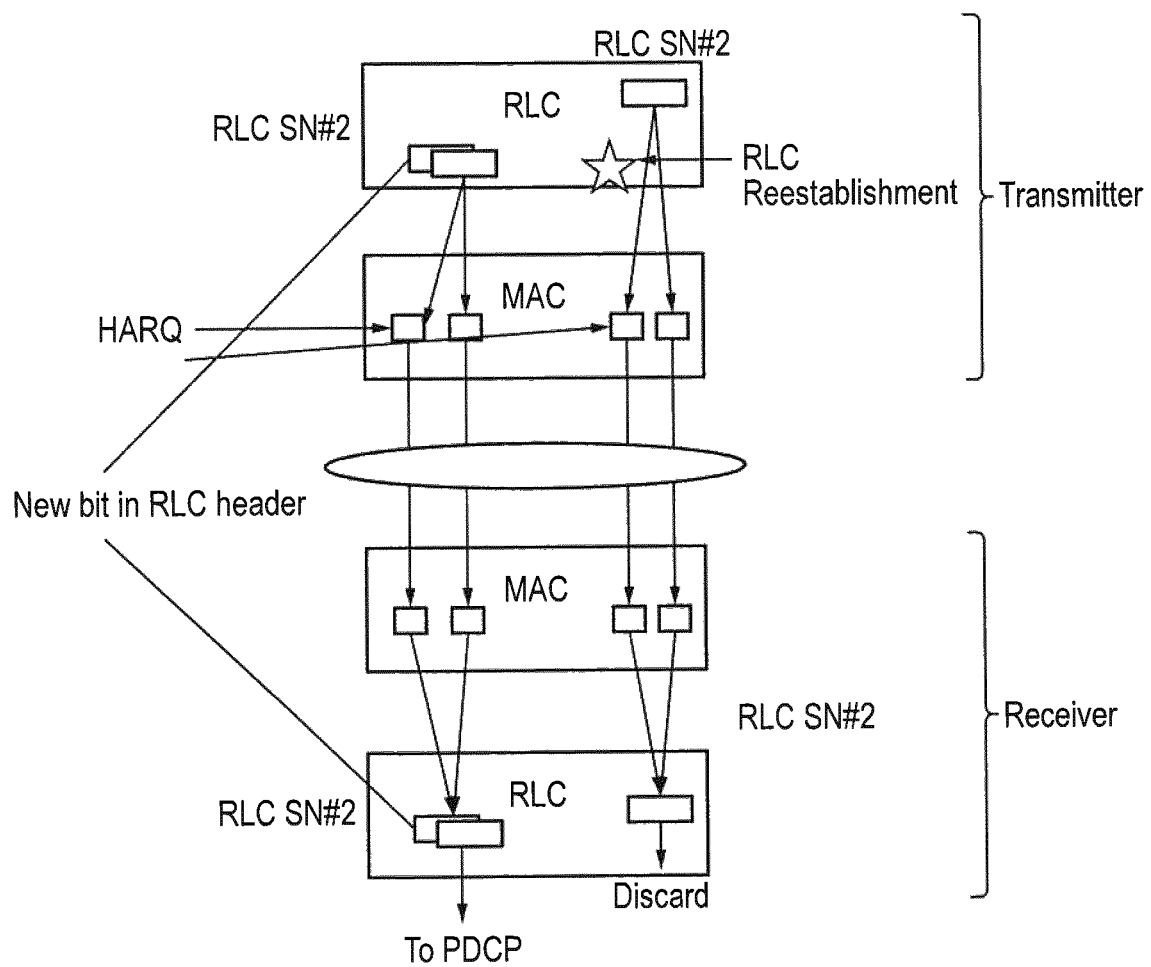
FIG. 10 shows a schematic representation of how a receiving RLC entity may differentiate between and discard one of two received PDUs with the same sequence number in accordance with embodiments of the present technique.

RLC receive entity may receive RLC PDU with same RLC SN before or after the reestablishment and the new bit will help receiver to discard the right packet i.e. the one with no toggle bit and keep the packet with toggled bit. This is visually demonstrated in FIG. 10. In other words, the communications device re-establishes its radio link control protocol layer in response to the reconfiguration message, and subsequently discards from a buffer of the communications device one or more data packets with headers that have not been changed by the master infrastructure equipment in response to the notification.

As an alternative to discarding the PDUs which correspond to transmissions before the RLC re-establishment, the UE may continue to attempt to reassemble those PDUs to form SDUs that can be passed to PDCP either by maintaining a separate buffer within the same RLC entity, or creating a duplicate RLC entity to handle PDUs from before and after re-establishment (which can avoid retransmissions from the upper layers—particularly a problem due to TCP slow start mechanisms. TCP interprets retransmissions as having been caused by network congestion, since it was initially designed for fixed line communication systems, and therefore the data rate slows upon any retransmissions, affecting the throughput temporarily). In other words, the communications device re-establishes its radio link control protocol layer in response to the reconfiguration message, and subsequently controls the storage of received data packets with headers that have or have not been changed by the master infrastructure equipment in response to the notification in separate buffers of the communications device. Alternatively, the communications device duplicates a radio link control entity of the communications device, the radio link control entity and the duplicate radio link control entity being used to separately handle received data packets with headers that have or have not been changed by the master infrastructure equipment in response to the determination. Alternatively, or additionally, the communications device duplicates a packet data convergence protocol entity of the communications device, the packet data convergence protocol entity and the duplicate packet data convergence protocol being used to separately handle received data packets with headers that have or have not been changed by the first infrastructure equipment in response to the determination.

In embodiments of the present technique, the infrastructure equipment and communications device may each comprise transmitter circuitry configured to transmit signals, receiver circuitry configured to receive signals, and controller circuitry configured to control the transmitter circuitry and the receiver circuitry. The controller circuitry may be, for example, a microprocessor, a CPU, or a dedicated chipset, etc. It will be appreciated by those skilled in the art that, in arrangements of the present technique, the communications device/UE may not always include a transmitter, for example in scenarios where the UE is a low-power wearable device.

Embodiments of the present technique apply to LTE RLC for example to applications such as new radio to improve LTE-NR interworking where LTE is master node and MCG-MAC is not reset due to MCG-RLC reestablishment. In other words, the master infrastructure equipment and the secondary infrastructure equipment operate in accordance with the same radio access technology. Embodiments of the present technique also apply to NR RLC in case of NR-NR multi connectivity and LTE-NR improved interworking when SCG-MAC is not reset due to SCG-RLC reestablishment. In other words, the master infrastructure equipment and the secondary infrastructure equipment operate in accordance with different radio access technologies.

Advantages of the present technique include that the MAC entity can continue the operation when upper layers have been re-established, avoiding the disruption of SRBs or SCG bearers, and avoiding any ambiguity at the RLC layer after re-establishment due to residual PDUs left over in MAC.

These examples may also be applied for mobility within a NR MCG as well. It has been assumed in these examples that LTE is the master and NR is the secondary, operating in accordance with LTE-NR improved interworking. For a deployment where NR is master and LTE is secondary, it is assumed that NR CU-DU split may happen and LTE may or may not support C-RAN architecture. No difference is foreseen between the two cases. In further arrangements of the present technique, NR may be both the master and the secondary, operating in accordance with NR-NR multi-connectivity.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The following numbered paragraphs provide further example aspects and features of the present technique:

Paragraph 1. A method for use in a mobile communications network, the mobile communications network comprising a plurality of infrastructure equipment each providing wireless connectivity within at least one cell, and a communications device configured to communicate wirelessly with at least a first of the infrastructure equipment including by the use of a radio bearer, the method comprising the first infrastructure equipment determining that there is a requirement to alter data handling resources allocated for handling the radio bearer in one or both of the first infrastructure equipment and the communications device, re-establishing, in response to the determination, its radio link control protocol layer, transmitting a reconfiguration message to the communications device to effect re-establishment of its radio link control protocol layer, and subsequently effecting a change in the header of data packets transmitted to the communications device.

Paragraph 2. A method according to Paragraph 1, wherein the cells are arranged into a master cell group under control of the first infrastructure equipment, the first infrastructure equipment being a master infrastructure equipment, and a secondary cell group under control of a secondary infrastructure equipment, and the communications device is configured to communicate wirelessly with the master infrastructure equipment and the secondary infrastructure equipment, and wherein the radio bearer is configured in dual connectivity and receivable at the secondary infrastructure equipment for splitting between the secondary infrastructure equipment and the master infrastructure equipment before delivery to the communications device.

Paragraph 3. A method according to Paragraph 2, wherein the determining that there is a requirement to the alter data handling resources comprises receiving at the master infrastructure equipment a notification transmitted by the secondary infrastructure equipment when the secondary infrastructure equipment exhausts a supply of unique parameter sets used in security ciphering of received radio bearers configured in dual connectivity.

Paragraph 4. A method according to Paragraph 1, wherein the cells are arranged into a master cell group under control of a master infrastructure equipment and a secondary cell group under control of the first infrastructure equipment, the first infrastructure equipment being a secondary infrastructure equipment, and the communications device is configured to communicate wirelessly with the master infrastructure equipment and the secondary infrastructure equipment, and wherein the radio bearer is configured in dual connectivity and receivable at the secondary infrastructure equipment for splitting between the secondary infrastructure equipment and the master infrastructure equipment before delivery to the communications device.

Paragraph 5. A method according to Paragraph 4, wherein the determining that there is a requirement to the alter data handling resources comprises exhausting at the secondary infrastructure equipment a supply of unique parameter sets used in security ciphering of received radio bearers configured in dual connectivity.

Paragraph 6. A method according to any of Paragraphs 1 to 6, wherein the change in the header of the data packets comprises the addition of a new bit.

Paragraph 7. A method according to Paragraph 6, wherein the new bit is added to the header of the data packets for a predetermined time after the re-establishment of the radio link control protocol layer of the first infrastructure equipment.

Paragraph 8. A method according to any of Paragraphs 1 to 7, wherein the change in the header of the data packets comprises toggling the value of a bit.

Paragraph 9. A method according to Paragraph 8, wherein the value of the bit is toggled for a predetermined time after the re-establishment of the radio link control protocol layer of the first infrastructure equipment.

Paragraph 10. A method according to any of Paragraphs 1 to 9, wherein the communications device re-establishes its radio link control protocol layer in response to the reconfiguration message, and subsequently discards from a buffer of the communications device one or more data packets with headers that have not been changed by the first infrastructure equipment in response to the determination.

Paragraph 11. A method according to any of Paragraphs 1 to 10, wherein the communications device re-establishes its radio link control protocol layer in response to the reconfiguration message, and subsequently, controls the storage of received data packets with headers that have or have not been changed by the first infrastructure equipment in response to the determination in separate buffers of the communications device.

Paragraph 12. A method according to any of Paragraphs 1 to 11, wherein the communications device duplicates a radio link control entity of the communications device, the radio link control entity and the duplicate radio link control entity being used to separately handle received data packets with headers that have or have not been changed by the first infrastructure equipment in response to the determination.

Paragraph 13. A method according to any of Paragraphs 1 to 12, wherein the communications device duplicates a packet data convergence protocol entity of the communications device, the packet data convergence protocol entity and the duplicate packet data convergence protocol being used to separately handle received data packets with headers that have or have not been changed by the first infrastructure equipment in response to the determination.

Paragraph 14. A method according to any of Paragraphs 2 to 13, wherein the master infrastructure equipment and the secondary infrastructure equipment operate in accordance with the same radio access technology.

Paragraph 15. A method according to any of Paragraphs 2 to 13, wherein the master infrastructure equipment and the secondary infrastructure equipment operate in accordance with different radio access technologies.

Paragraph 16. A mobile communications network comprising a plurality of infrastructure equipment each providing wireless connectivity within at least one cell, and a communications device configured to communicate wirelessly with at least a first of the infrastructure equipment including by the use of a radio bearer, wherein the first infrastructure equipment is configured to determine that there is a requirement to alter data handling resources allocated for handling the radio bearer in one or both of the first infrastructure equipment and the communications device, to re-establish, in response to the determination, its radio link control protocol layer, to transmit a reconfiguration message to the communications device to effect re-establishment of its radio link control protocol layer, and subsequently to effect a change in the header of data packets transmitted to the communications device.

Paragraph 17. Circuitry for a mobile communications network comprising a plurality of infrastructure equipment each providing wireless connectivity within at least one cell, and a communications device configured to communicate wirelessly with at least a first of the infrastructure equipment including by the use of a radio bearer, wherein the first infrastructure equipment is configured to determine that there is a requirement to alter data handling resources allocated for handling the radio bearer in one or both of the first infrastructure equipment and the communications device, to re-establish, in response to the determination, its radio link control protocol layer, to transmit a reconfiguration message to the communications device to effect re-establishment of its radio link control protocol layer, and subsequently to effect a change in the header of data packets transmitted to the communications device.

Paragraph 18. An infrastructure equipment for use in a mobile communications network, the mobile communications network comprising one or more other infrastructure equipment, the infrastructure equipment and other infrastructure equipment each providing wireless connectivity within at least one cell, and a communications device configured to communicate wirelessly with the infrastructure equipment including by the use of a radio bearer, wherein the infrastructure equipment comprises transmitter circuitry configured to transmit signals to the communications device and to the other infrastructure equipment, receiver circuitry configured to receive signals from the communications device and from the other infrastructure equipment, and controller circuitry configured to control the transmitter circuitry and the receiver circuitry to determine that there is a requirement to alter data handling resources allocated for handling the radio bearer in one or both of the infrastructure equipment and the communications device, to re-establish, in response to the determination, its radio link control protocol layer, to transmit a reconfiguration message to the communications device to effect re-establishment of its radio link control protocol layer, and subsequently to effect a change in the header of data packets transmitted to the communications device.

Paragraph 19. A method of operating an infrastructure equipment for use in a mobile communications network, the mobile communications network comprising one or more other infrastructure equipment, the infrastructure equipment and other infrastructure equipment each providing wireless connectivity within at least one cell, and a communications device configured to communicate wirelessly with the infrastructure equipment including by the use of a radio bearer, wherein the method comprises determining that there is a requirement to alter data handling resources allocated for handling the radio bearer in one or both of the infrastructure equipment and the communications device, re-establishing, in response to the determination, its radio link control protocol layer, transmitting a reconfiguration message to the communications device to effect re-establishment of its radio link control protocol layer, and subsequently effecting a change in the header of data packets transmitted to the communications device.

Paragraph 20. Circuitry for an infrastructure equipment for use in a mobile communications network, the mobile communications network comprising one or more other infrastructure equipment, the infrastructure equipment and other infrastructure equipment each providing wireless connectivity within at least one cell, and a communications device configured to communicate wirelessly with the infrastructure equipment including by the use of a radio bearer, wherein the infrastructure equipment comprises transmitter circuitry configured to transmit signals to the communications device and to the other infrastructure equipment, receiver circuitry configured to receive signals from the communications device and from the other infrastructure equipment, and controller circuitry configured to control the transmitter circuitry and the receiver circuitry to determine that there is a requirement to alter data handling resources allocated for handling the radio bearer in one or both of the infrastructure equipment and the communications device, to re-establish, in response to the determination, its radio link control protocol layer, to transmit a reconfiguration message to the communications device to effect re-establishment of its radio link control protocol layer, and subsequently to effect a change in the header of data packets transmitted to the communications device.

Paragraph 21. A communications device for use in a mobile communications network, the mobile communications network comprising one or more other infrastructure equipment, the infrastructure equipment and other infrastructure equipment each providing wireless connectivity within at least one cell, wherein the communications device comprises transmitter circuitry configured to transmit signals to the infrastructure equipment, receiver circuitry configured to receive signals from the infrastructure equipment, and controller circuitry configured to control the transmitter circuitry and the receiver circuitry to communicate wirelessly with at least a first of the infrastructure equipment including by the use of a radio bearer, to receive a reconfiguration message from the first infrastructure equipment to effect re-establishment of its radio link control protocol layer, and subsequently to re-establish its radio link control protocol layer in response to the reconfiguration message.

Paragraph 22. A method of operating a communications device for use in a mobile communications network, the mobile communications network comprising one or more other infrastructure equipment, the infrastructure equipment and other infrastructure equipment each providing wireless connectivity within at least one cell, wherein the method comprises communicating wirelessly with at least a first of the infrastructure equipment including by the use of a radio bearer, receiving a reconfiguration message from the first infrastructure equipment to effect re-establishment of its radio link control protocol layer, and subsequently re-establishing its radio link control protocol layer in response to the reconfiguration message.

Paragraph 23. Circuitry for a communications device for use in a mobile communications network, the mobile communications network comprising one or more other infrastructure equipment, the infrastructure equipment and other infrastructure equipment each providing wireless connectivity within at least one cell, wherein the communications device comprises transmitter circuitry configured to transmit signals to the infrastructure equipment, receiver circuitry configured to receive signals from the infrastructure equipment, and controller circuitry configured to control the transmitter circuitry and the receiver circuitry to communicate wirelessly with at least a first of the infrastructure equipment including by the use of a radio bearer, to receive a reconfiguration message from the first infrastructure equipment to effect re-establishment of its radio link control protocol layer, and subsequently to re-establish its radio link control protocol layer in response to the reconfiguration message.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009

What is claimed is:

1. A method for use in a mobile communications network, the mobile communications network including a plurality of infrastructure equipment each providing wireless connectivity within at least one cell, and a communications device configured to communicate wirelessly with at least a first infrastructure equipment including use of a radio bearer, wherein the first infrastructure equipment performs the method comprising:

determining that there is a requirement to alter data handling resources allocated for handling the radio bearer in one or both of the first infrastructure equipment and the communications device, re-establishing, in response to the determination, its radio link control protocol layer, transmitting a reconfiguration message to the communications device to effect re-establishment of its radio link control protocol layer, and subsequently adding a new bit in a header of data packets transmitted to the communications device for a predetermined time after re-establishment of the radio link control protocol layer of the first infrastructure equipment.

2. A method according to claim 1, wherein the cells are arranged into a master cell group under control of the first infrastructure equipment, the first infrastructure equipment being a master infrastructure equipment, and a secondary cell group under control of a secondary infrastructure equipment, and the communications device is configured to communicate wirelessly with the master infrastructure equipment and the secondary infrastructure equipment, and wherein the radio bearer is configured in dual connectivity and receivable at the secondary infrastructure equipment for splitting between the second infrastructure equipment and the master infrastructure equipment before delivery to the communications device.

3. A method according to claim 2, wherein determining that there is a requirement to alter data handling resources comprises receiving at the master infrastructure equipment a notification transmitted by the secondary infrastructure equipment when the secondary infrastructure equipment exhausts a supply of unique parameter sets used in security ciphering of received radio bearers configured in dual connectivity.

4. A method according to claim 1, wherein the cells are arranged into a master cell group under control of a master infrastructure equipment and a secondary cell group under control of the first infrastructure equipment, the first infrastructure equipment being a secondary infrastructure equipment, and the communications device is configured to communicate wirelessly with the master infrastructure equipment and the secondary infrastructure equipment, and wherein the radio bearer is configured in dual connectivity and receivable at the secondary infrastructure equipment for splitting between the secondary infrastructure equipment and the master infrastructure equipment before delivery to the communications device.

5. A method according to claim 4, wherein the determining that there is a requirement to alter data handling resources comprises exhausting at the secondary infrastructure equipment a supply of unique parameter sets used in security ciphering of received radio bearers configured in dual connectivity.

6. A method according to claim 1, further comprising toggling a value of the new bit.

7. A method according to claim 6, wherein the value of the new bit is toggled for a predetermined time after the re-establishment of the radio link control protocol layer of the first infrastructure equipment.

8. A method according to claim 1, wherein the communications device re-establishes its radio link control protocol layer in response to the reconfiguration message, and subsequently discards from a buffer of the communications device one or more data packets with headers that have not been changed by the first infrastructure equipment in response to the determination.

9. A method according to claim 1, wherein the communications device re-establishes its radio link control protocol layer in response to the reconfiguration message, and subsequently, controls storage of received data packets with headers that have or have not been changed by the first infrastructure equipment in response to the determination in separate buffers of the communications device.

10. A method according to claim 1, wherein the communications device duplicates a radio link control entity of the communications device, the radio link control entity and the duplicate radio link control entity being used to separately handle received data packets with headers that have or have not been changed by the first infrastructure equipment in response to the determination.

11. A method according to claim 1, wherein the communications device duplicates a packet data convergence protocol entity of the communications device, the packet data convergence protocol entity and the duplicate packet data convergence protocol being used to separately handle received data packets with headers that have or have not been changed by the first infrastructure equipment in response to the determination.

12. A method according to claim 2, wherein the master infrastructure equipment and the secondary infrastructure equipment operate in accordance with the same radio access technology.

13. A method according to claim 2, wherein the master infrastructure equipment and the secondary infrastructure equipment operate in accordance with different radio access technologies.

14. An infrastructure equipment for use in a mobile communications network, the mobile communications network including one or more other infrastructure equipment, the infrastructure equipment and other infrastructure equipment each providing wireless connectivity within at least one cell, and a communications device configured to communicate wirelessly with the infrastructure equipment including use of a radio bearer, wherein the infrastructure equipment comprises:
 transmitter circuitry configured to transmit signals to the communications device and to the other infrastructure equipment,
 receiver circuitry configured to receive signals from the communications device and from the other infrastructure equipment, and
 controller circuitry configured to control the transmitter and the receiver circuitry
 to determine that there is a requirement to alter data handling resources allocated for handling the radio bearer in one or both of the infrastructure equipment and the communications device,
 to re-establish, in response to the determination, its radio link control protocol layer,
 to transmit a reconfiguration message to the communications device to effect re-establishment of its radio link control protocol layer, and subsequently
 to add a new bit in a header of data packets transmitted to the communications device for a predetermined time after re-establishment of the radio link control protocol layer of the infrastructure equipment.

15. A method for use in a mobile communications network, the mobile communications network including
 a plurality of infrastructure equipment each providing wireless connectivity within at least one cell, and
 a communications device configured to communicate wirelessly with at least a first of the infrastructure equipment including by the use of a radio bearer, the method comprising the first infrastructure equipment, wherein the method comprises:
 determining that there is a requirement to alter data handling resources allocated for handling the radio bearer in one or both of the first infrastructure equipment and the communications device,
 re-establishing, in response to the determination, its radio link control protocol layer,
 transmitting a reconfiguration message to the communications device to effect re-establishment of its radio link control protocol layer, and subsequently effecting a change in a header of data packets transmitted to the communications device, wherein
 the cells are arranged into a master cell group under control of the first infrastructure equipment, the first infrastructure equipment being a master infrastructure equipment, and a secondary cell group under control of a secondary infrastructure equipment, and the communications device is configured to communicate wirelessly with the master infrastructure equipment and the secondary infrastructure equipment,
 the radio bearer is configured in dual connectivity and receivable at the secondary infrastructure equipment for splitting between the secondary infrastructure equipment and the master infrastructure equipment before delivery to the communications device, and
 determining that there is a requirement to the alter data handling resources comprises receiving at the master infrastructure equipment a notification transmitted by the secondary infrastructure equipment when the secondary infrastructure equipment exhausts a supply of unique parameter sets used in security ciphering of received radio bearers configured in dual connectivity.

* * * * *